US009621942B2

(12) United States Patent
Seo et al.

(10) Patent No.: US 9,621,942 B2
(45) Date of Patent: Apr. 11, 2017

(54) DISPLAY APPARATUS, PAID BROADCAST PROCESSING APPARATUS, AND CONTROL METHOD THEREOF

(71) Applicant: SAMSUNG ELECTRONICS CO., LTD., Suwon-si (KR)

(72) Inventors: Min-suk Seo, Suwon-si (KR); Jeong-kee Park, Seongnam-si (KR); Jong-po Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 14/291,647

(22) Filed: May 30, 2014

(65) Prior Publication Data

US 2015/0082334 A1 Mar. 19, 2015

(30) Foreign Application Priority Data

Sep. 16, 2013 (KR) ........................ 10-2013-0111307

(51) Int. Cl.
*H04N 7/16* (2011.01)
*H04N 21/418* (2011.01)
(Continued)

(52) U.S. Cl.
CPC ..... *H04N 21/4181* (2013.01); *H04N 21/4104* (2013.01); *H04N 21/4263* (2013.01); *H04N 21/4316* (2013.01); *H04N 21/4405* (2013.01)

(58) Field of Classification Search
CPC ........... H04N 21/4181; H04N 21/4104; H04N 21/4263; H04N 21/4316; H04N 21/4405
See application file for complete search history.

(56) References Cited

U.S. PATENT DOCUMENTS 6,035,037 A * 3/2000 Chaney ................. H04N 7/163
348/565
2001/0056576 A1 12/2001 Park
(Continued)

FOREIGN PATENT DOCUMENTS

EP 1662361 A1 5/2006
EP 2091229 A2 8/2009
(Continued)

OTHER PUBLICATIONS

Communication dated Oct. 22, 2015, issued by the European Patent Office in counterpart European Application No. 14159292.3.
(Continued)

*Primary Examiner* — Oschta Montoya
(74) *Attorney, Agent, or Firm* — Sughrue Mion, PLLC (57) ABSTRACT

A display apparatus, a paid broadcast processing apparatus, and a control method thereof are provided. The display apparatus includes: a tuner configured to receive at least one broadcast signal through at least one broadcast channel; a signal processor configured to signal-process the received at least one broadcast signal; a display configured to display the signal-processed at least one broadcast signal; an interface connected with at least one paid broadcast processing apparatus which descrambles at least one paid broadcast signal; and a controller configured to control the signal processor to signal-process the received at least one broadcast signal into a form that is displayable through the display, and, when the received at least one broadcast signal is the at least one paid broadcast signal, transmit the at least one paid broadcast signal to the paid broadcast processing apparatus through the interface.

8 Claims, 5 Drawing Sheets

(51) Int. Cl.
  *H04N 21/41*     (2011.01)
  *H04N 21/426*    (2011.01)
  *H04N 21/431*    (2011.01)
  *H04N 21/4405*   (2011.01)

(56) References Cited

U.S. PATENT DOCUMENTS

| | | |
|---|---|---|
| 2004/0114051 A1 | 6/2004 | Tournier |
| 2012/0060179 A1* | 3/2012 | Lyu .................... H04N 21/2225 |
| | | 725/27 |
| 2012/0108209 A1* | 5/2012 | Sun ........................ H04H 60/15 |
| | | 455/411 |
| 2012/0311637 A1* | 12/2012 | Anthru ................... H04N 5/445 |
| | | 725/44 |
| 2012/0321080 A1 | 12/2012 | Candelore et al. |

FOREIGN PATENT DOCUMENTS

| | | |
|---|---|---|
| GB | 2442779 A | 4/2008 |
| WO | 2006080724 A1 | 8/2006 |

OTHER PUBLICATIONS

Communication dated Oct. 23, 2014, issued by the European Patent Office in counterpart European Application No. 14159292.3.

* cited by examiner

DISPLAY APPARATUS, PAID BROADCAST PROCESSING APPARATUS, AND CONTROL METHOD THEREOF

CROSS-REFERENCE TO RELATED APPLICATION

This application claims priority from Korean Patent Application No. 10-2013-0111307, filed on Sep. 16, 2013 in the Korean Intellectual Property Office, the entire disclosure of which is hereby incorporated herein by reference.

BACKGROUND

Field

Apparatuses and methods consistent with exemplary embodiments relate to a display apparatus, a paid broadcast processing apparatus, and a control method thereof, and more particularly, to a display apparatus for viewing a paid broadcast, a paid broadcast processing apparatus, and a control method thereof.

Description of the Related Art

In general, display apparatuses receive broadcast signals through a broadcast channel that is tuned from among a plurality of broadcast channels related to a terrestrial broadcast, a satellite broadcast, and a cable broadcast, and display the broadcast signals. Such a broadcast signal may be divided into a free broadcast signal and a paid broadcast signal. In the case of the paid broadcast signal, the display apparatus descrambles a scramble broadcast signal which is a paid broadcast signal using a Conditional Access System (CAS) method or a Common Interface (CI) method, and displays the broadcast signal.

The CAS method is a method that encrypts a paid broadcast signal and allows a viewer to view the paid broadcast signal when the viewer pays for the broadcast signal. Such a CAS may be mounted in a Set-Top Box (STB).

The CI method is a method that allows a viewer to view a paid broadcast signal through an authentication module apparatus equipped with the CAS function. The authentication module apparatus is physically connected with an external terminal provided in the display apparatus and descrambles the paid broadcast signal.

When the external terminal to be physically connected with the authentication module apparatus is not provided in the display apparatus, the user is not able to view the paid broadcast signal through the display apparatus. In addition, when the external terminal to be physically connected with the authentication module apparatus is provided, it may be difficult to achieve a slim design of the display apparatus and also it may be difficult to implement an overall system of the display apparatus because circuit wires are expanded due to the presence of the external terminal.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which can have a slim design and implement a simple product, and which is physically connected with at least one paid broadcast processing apparatus which descrambles a paid broadcast signal.

According to an aspect of an exemplary embodiment, there is provided a display apparatus comprising: a tuner configured to receive at least one broadcast signal through at least one broadcast channel; a signal processor configured to signal-process the received at least one broadcast signal; a display configured to display the signal-processed at least one broadcast signal; an interface connected with at least one paid broadcast processing apparatus which descrambles at least one paid broadcast signal; and a controller configured to control the signal processor to signal-process the received at least one broadcast signal into a form that is displayable through the display, and, when the received at least one broadcast signal is the at least one paid broadcast signal, transmit the at least one paid broadcast signal to the at least one paid broadcast processing apparatus through the interface.

The display apparatus may further include a storage configured to store at least one paid broadcast channel information of the at least one paid broadcast processing apparatus which is connected through the interface, and the controller may determine whether the at least one paid broadcast processing apparatus is able to descramble the at least one paid broadcast signal based on at least one paid broadcast channel information stored in the storage, and transmits the at least one paid broadcast signal to the at least one paid broadcast processing apparatus.

The at least one paid broadcast processing apparatus may be connected with the interface in a USB method, and, when the at least one paid broadcast signal is received through the interface, the at least one paid broadcast processing apparatus may descramble the at least one paid broadcast signal through an authentication card inserted into a card slot and may transmit the at least one paid broadcast signal to the display apparatus.

The tuner may comprise: a first tuner configured to receive at least one broadcast signal through a tuned first at least one broadcast channel; and a second tuner configured to receive a broadcast signal through a tuned second at least one broadcast channel, and, when one of the at least one broadcast signals received from the first tuner and the second tuner is a free at least one broadcast signal and the other at least one broadcast signal is the at least one paid broadcast signal, the controller may control the signal processor and the display to display broadcast signals which are descrambled related to the free at least one broadcast signal and the paid at least one broadcast signal on a first area and a second area, respectively.

When the broadcast signals received from the first tuner and the second tuner may be the at least one paid broadcast signals, the controller may control the signal processor and the display to display at least one broadcast signal that is descrambled and is related to one of the at least one paid broadcast signals on one of the first area and the second area, to generate a message that the other paid at least one broadcast signal cannot be processed and display the message on the other one of the first area and the second area.

The interface may include: a first interface connected with a first paid broadcast processing apparatus configured to descramble a paid broadcast signal of a first paid broadcast channel; and a second interface connected with a second paid broadcast processing apparatus configured to descramble a paid broadcast signal of a second paid broadcast channel, and, when the broadcast signals received from the first tuner and the second tuner are the at least one paid broadcast signals, the controller may transmit the at least one paid broadcast signals to the first paid at least one broadcast processing apparatus and the second paid broadcast processing apparatus through the first interface and the second interface respectively, based on the paid broadcast channel information stored in the storage.

According to an aspect of another exemplary embodiment, there is provided at least one paid broadcast processing apparatus including: an interface connected with a display apparatus; a card slot into which an authentication card to descramble at least one paid broadcast signal received through the interface, to be displayed on the display apparatus is inserted; and a controller configured to convert the at least one paid broadcast signal into a form that is recognizable by the authentication card, and configured to convert a broadcast signal which is descrambled through the authentication card into a signal of a standard related to the connection between the interface and the display apparatus, and to transmit the at least one broadcast signal to the display apparatus through the interface.

According to an aspect of still another exemplary embodiment, there is provided a control method of a display apparatus, the method including: receiving at least one broadcast signal through at least one broadcast channel; determining whether or not the received at least one broadcast signal is at least one paid broadcast signal; when the at least one broadcast signal is the at least one paid broadcast signal, transmitting the at least one paid broadcast signal to at least one paid broadcast processing apparatus which is connected with the display apparatus and which descrambles the at least one paid broadcast signal; and when the descrambled broadcast signal is received from the at least one paid broadcast processing apparatus, signal-processing the descrambled broadcast signal and displaying a signal-processed broadcast signal.

The transmitting may include determining whether the at least one paid broadcast processing apparatus is able to descramble the paid broadcast signal based on pre-stored paid broadcast channel information pre-stored related to the at least one paid broadcast processing apparatus, and transmitting the at least one paid broadcast signal to the at least one paid broadcast processing apparatus.

When the paid broadcast signal is received, the at least one paid broadcast processing apparatus may descramble the at least one paid broadcast signal through an authentication card inserted into a card slot and may transmit the at least one paid broadcast signal to the display apparatus.

The receiving may include receiving a broadcast signal of a first broadcast channel tuned by a first tuner and a broadcast signal of a second broadcast channel tuned by a second tuner, and the displaying may include, when one of the broadcast signals received from the first tuner and the second tuner is a free broadcast signal and the other broadcast signal is the at least one paid broadcast signal, displaying at least one broadcast signals which are descrambled related to the free broadcast signal and the paid broadcast signal on a first area and a second area, respectively.

The displaying may include, when the at least one broadcast signals received from the first tuner and the second tuner are at least one paid broadcast signals, displaying at least one broadcast signal that is descrambled related to one of the at least one paid broadcast signals on one of the first area and the second area, generating a message that the other paid broadcast signal cannot be processed, and displaying the message on the other one of the first area and the second area.

The display apparatus may be connected with a first paid broadcast processing apparatus which descrambles a paid broadcast signal of a first paid broadcast channel through a first interface, and may be connected with a second paid broadcast processing apparatus which descrambles a paid broadcast signal of a second paid broadcast channel through a second interface, and the transmitting may include, when the broadcast signals received from the first tuner and the second tuner are the at least one paid broadcast signals, transmitting the at least one paid broadcast signals to the first paid broadcast processing apparatus and the second paid broadcast processing apparatus through the first interface and the second interface based on the pre-stored at least one paid broadcast channel information.

According to an aspect of still another exemplary embodiment, there is provided a control method of at least one paid broadcast processing apparatus, the method including: receiving at least one paid broadcast signal from a display apparatus; determining whether or not an authentication card to descramble the at least one paid broadcast signal is inserted into a card slot; when the authentication card is inserted, converting the paid broadcast signal into a form that is recognizable by the authentication card; and converting a broadcast signal which is descrambled through the authentication card into a signal of a standard related to a connection with the display apparatus, and transmitting the at least one broadcast signal to the display apparatus.

According to the exemplary embodiments described above, the display apparatus is connected with the at least one paid broadcast processing apparatus in the USB method, so that a slim design of the display apparatus can be achieved and a simple product can be implemented, and also, may be physically connected with the at least one paid broadcast processing apparatus which descrambles the at least one paid broadcast signal.

BRIEF DESCRIPTION OF THE DRAWINGS

The above and/or other aspects will be more apparent by describing in detail exemplary embodiments, with reference to the accompanying drawings, in which.

DETAILED DESCRIPTION

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
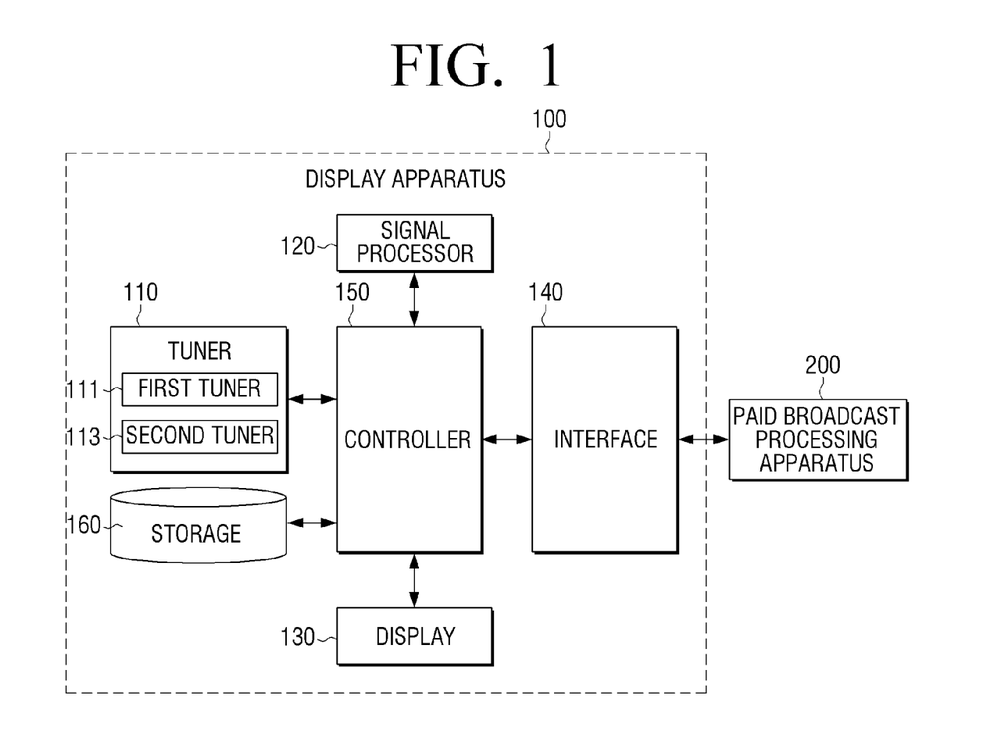
FIG. 1 is a first block diagram of a display apparatus which displays a paid broadcast signal according to an exemplary embodiment.

FIG. 1 is a first block diagram of a display apparatus which displays a paid broadcast signal according to an exemplary embodiment.

As shown in FIG. 1, a display apparatus 100 includes a tuner 110, a signal processor 120, a display 130, an interface 140, and a controller 150.

The tuner 110 tunes to at least one broadcast signal and receives a broadcast signal through the tuned broadcast channel. The tuner 110 may include first and second tuners 111 and 113. The first tuner 111 receives a broadcast signal through a tuned first broadcast channel and the second tuner 113 receives a broadcast signal through a tuned second broadcast channel. According to an exemplary embodiment, the first tuner 111 is a tuner that is initially set as a main tuner and may receive a broadcast signal through a terrestrial broadcast channel or a cable broadcast channel, and the second tuner 113 is a tuner that is initially set as a sub tuner and may receive a broadcast signal through a satellite broadcast channel.

Accordingly, the display apparatus 100 may display a broadcast image by receiving a broadcast signal through a broadcast channel tuned by the first tuner 111 according to a user command, or may display a multi-broadcast image in the form of a Picture In Picture (PIP) by receiving broadcast signals tuned by the first and second tuners 111 and 113.

The signal processor 120 signal-processes the broadcast signals received through the tuner 110. Specifically, the signal processor 120 may include a demodulator (not shown), a demultiplexer (not shown), a decoder (not shown), and a scaler (not shown). The demodulator (not shown) demodulates the broadcast signal that has been modulated and received through at least one broadcast channel that is tuned by the tuner 110 from among the terrestrial broadcast channel, the cable broadcast channel, and the satellite broadcast channel, into the original signal. The demultiplexer (not shown) divides the demodulated broadcast signal into audio and video signals, and the decoder (not shown) decodes the audio and video signals. The scaler (not shown) scales the decoded audio and video signals to meet a standard output through the display 130. The elements of the signal processor 120 are well known and thus detailed descriptions thereof are omitted.

The display 130 displays the broadcast signal which is signal-processed by the signal processor 120. According to an exemplary embodiment, the display apparatus 100 may receive a broadcast signal through the broadcast channel tuned by the first tuner 111 which is set as the main tuner from among the first and second tuners 111 and 113. In this case, the display 130 may display the broadcast signal that has been received through the first tuner 111 which is set as the main tuner from among the first and second tuners 111 and 113, and signal-processed.

According to another exemplary embodiment, the display apparatus 100 may receive broadcast signals through a plurality of broadcast channels tuned by the first and second tuners 111 and 113. In this case, the display 130 may display the broadcast signals which have been received through the first and the second tuners 111 and 113 and signal-processed in the form of the PIP. That is, the display 130 may display the broadcast signal which have been received through the first tuner 111, which is set as the main tuner, and signal-processed on a first area, which is a main screen, and may display the broadcast signal which have been received through the second tuner 113, which is set as the sub tuner, and signal-processed on a second area, which is a sub screen.

The interface 140 is connected with a paid broadcast processing apparatus 200, which descrambles paid broadcast signals, according to a Universal Serial Bus (USB) method. The controller 150 controls the elements of the display apparatus 100. In particular, the controller 150 controls the signal processor 120 to signal-process the broadcast signal received through at least one of the first and second tuners 111 and 113 into a form that is displayable through the display 130.

As described above, when a broadcast signal is received through at least one of the first and second tuners 111 and 113, the controller 150 determines whether the received broadcast signal is a paid broadcast signal which is received through a paid broadcast channel or not. As a result, when the received broadcast signal is a free broadcast signal, the controller 150 controls the signal processor 120 to signal-process the received broadcast signal into the form that is displayable through the display 130 as described above.

To contrast, when the received broadcast signal is the paid broadcast signal, the controller 150 transmits the paid broadcast signals to the paid broadcast processing apparatus 200 through the interface 140. Accordingly, the paid broadcast processing apparatus 200 descrambles the paid broadcast signal received through the interface 140 and transmits the paid broadcast signal to the display apparatus 100. When the descrambled broadcast signal is received from the paid broadcast processing apparatus 200, the signal processor 120 signal-processes the descrambled broadcast signal into a displayable form according to a control command of the controller 150. Accordingly, the display 130 may display the paid broadcast signal received from at least one of the first and second tuners 111 and 113 on a screen.

Specifically, the controller 150 determines whether the paid broadcast processing apparatus 200, which is physically connected through the interface 140, is able to descramble the paid broadcast signal or not based on paid broadcast channel information stored in the storage 160. The paid broadcast channel information recited herein may be information on a paid broadcast channel that can be descrambled by the paid broadcast processing apparatus 200 physically connected through the interface 140. For example, the paid broadcast processing apparatus 200 physically connected through the interface 140 is able to descramble a paid broadcast signal of a first channel, and the paid broadcast signal received through at least one of the first and second tuners 111 and 113 may be a broadcast signal of a second channel.

In this case, the controller 150 determines that the paid broadcast processing apparatus 200 physically connected through the interface 140 is unable to descramble the paid broadcast signal based on the paid broadcast channel information stored in the storage 160. When the paid broadcast processing apparatus 200 physically connected through the interface 140 is unable to descramble the paid broadcast signal, the display 130 displays a message that the paid broadcast signal cannot be processed according to a control command of the controller 150.

On the other hand, when the paid broadcast signal received through at least one of the first and second tuners 111 and 113 is the broadcast signal of the first channel, the controller 150 determines that the paid broadcast processing apparatus 200 physically connected through the interface 140 is able to descramble the paid broadcast signal based on the paid broadcast channel information of the paid broadcast processing apparatus 200 stored in the storage 160, and transmits the paid broadcast signal to the paid broadcast processing apparatus 200. At this time, the controller 150 converts the paid broadcast signal into a broadcast signal of the USB standard to transmit the paid broadcast signal to the paid broadcast processing apparatus 200. Accordingly, the interface 140 transmits the paid broadcast signal converted into the broadcast signal of the USB standard to the paid broadcast processing apparatus 200, and the paid broadcast processing apparatus 200 descrambles the paid broadcast signal received through the interface 140 and transmits the paid broadcast signal to the display apparatus 100.

Each element of the paid broadcast processing apparatus 200 which descrambles the paid broadcast signal received from the display apparatus 100 will be explained in detail below.

As in the above-described exemplary embodiment, the display 130 may receive broadcast signals of different broadcast channels tuned by the first and second tuners 111 and 113 and may display the broadcast signals in the form of the PIP. Specifically, the first tuner 111 may receive a first broadcast signal through a tuned first broadcast channel, and the second tuner 113 may receive a second broadcast signal through a tuned second broadcast channel. In this case, the controller 150 determines whether the first and second broadcast signals received from the first and second tuners 111 and 113 are free broadcast signals or paid broadcast signals. When the first broadcast signal received through the first tuner 111 is a free broadcast signal, the controller 150 controls the signal processor 120 and the display 130 to display the first broadcast signal received through the first tuner 111 on the first area, which is the main screen. Accordingly, the display 130 displays the first broadcast signal signal-processed by the signal processor 120 on the first area which is the main screen.

On the other hand, when the second broadcast signal received through the second tuner 113 is a paid broadcast signal, the controller 150 may determine whether the paid broadcast processing apparatus 200 physically connected through the interface 140 is able to descramble the second broadcast signal, which is the paid broadcast signal, based on pre-stored paid broadcast channel information. When the paid broadcast processing apparatus 200 is able to descramble the second broadcast signal, the controller 150 converts the second broadcast signal into a broadcast signal suitable for the USB standard and transmits the second broadcast signal to the paid broadcast processing apparatus 200. Subsequently, when the second broadcast signal which has been descrambled by the paid broadcast processing apparatus 200 is received, the controller 150 controls the signal processor 120 and the display 130 to display the descrambled second broadcast signal on the second area, which is the sub screen. Accordingly, the display 130 displays the second broadcast signal signal-processed by the signal processor 120 on the second area, which is the sub screen.

That is, the display 130 may display the first broadcast signal which is free broadcast signal from among the broadcast signals received through the first and second tuners 111 and 113 on the first area which is the main screen, and may display the second broadcast signal which is the descrambled paid broadcast signal on the second area.

When all of the broadcast signals received from the first and second tuners 111 and 113 are paid broadcast signals, the controller 150 controls the signal processor 120 and the display 130 to display a broadcast signal that has been descrambled regarding at least one of the received paid broadcast signals on one of the first and second areas. The controller 150 controls the signal processor 120 and the display 130 to generate a message that the other paid broadcast signal cannot be processed, and displays the message on the other area.

According to an exemplary embodiment, the first and second broadcast channels received through the first and second broadcast channels tuned by the first and second tuners 111 and 113 may be paid broadcast signals. In this case, the controller 150 determines whether the paid broadcast processing apparatus 200 physically connected through the interface 140 is able to descramble the first and second broadcast signals based on the paid broadcast channel information pre-stored in the storage 160. For example, when the controller 150 determines that the paid broadcast processing apparatus 200 physically connected through the interface 140 is able to descramble the first broadcast signal, the controller 150 converts the first broadcast signal to meet the USB standard and transmits the first broadcast signal to the paid broadcast processing apparatus 200. Subsequently, when the first broadcast signal that has been descrambled by the paid broadcast processing apparatus 200 is received, the controller 150 controls the signal processor 120 and the display 130 to display the first broadcast signal which has been descrambled on the first area, which is the main screen. At this time, the controller 150 controls the signal processor 120 and the display 130 to generate a message that the second broadcast signal cannot be descrambled, and displays the message on the second area which is the sub screen.

Accordingly, the display 130 displays the first broadcast signal which has been descrambled on the first area which is the main screen, and displays the message regarding the second broadcast signal that cannot be descrambled on the second area which is the sub screen.

According to another exemplary embodiment, when the display 130 displays a first broadcast signal which is a free broadcast signal on the first area and displays a second broadcast signal which is a paid broadcast signal on the second area, and, when a channel change command on the first tuner 111 is input by the user, the first tuner 111 may tune to a broadcast channel corresponding to the input channel change command and may receive a third broadcast signal. When the third broadcast signal is received, the controller 150 determines whether the third broadcast signal is a paid broadcast signal or not. When the controller 150 determines that the third broadcast signal is a free broadcast signal, the controller 150 controls the signal processor 120 and the display 130 to convert the first broadcast signal displayed on the first area into the third broadcast signal and display the third broadcast signal. In contrast, when the third broadcast signal is a paid broadcast signal, the controller 150 determines whether the paid broadcast processing apparatus 200 physically connected through the interface 140 is able to descramble the third broadcast signal based on pre-stored paid broadcast channel information. When the controller 150 determines that the paid broadcast processing apparatus 200 is unable to descramble the third broadcast signal, the controller 150 controls the signal processor 120 and the display to generate a message that the third broadcast signal cannot be processed and displays the message on the first area. Accordingly, the display 130 displays the message that the third broadcast signal cannot be processed on the first area for a predetermined threshold time and then displays the first broadcast signal on the first area again. However, this should not be considered the only manner of operation of this embodiment. The display 130 may continue to display the message that the third broadcast signal cannot be processed on the first area according to a control command of the controller 150 until a broadcast signal corresponding to a user command is displayed, or may display the message that the third broadcast signal cannot be processed on a side of the first area on which the first broadcast signal is displayed for a predetermined threshold time.

According to additional aspects, the interface 140 may include a plurality of interfaces and may be physically connected with a plurality of paid broadcast processing apparatuses 200. Hereinafter, a display apparatus 100 which is physically connected with a plurality of paid broadcast processing apparatuses 200 through the plurality of interfaces 140 and an operation of descrambling a plurality of paid broadcast signals will be explained in detail.

Figure 2:
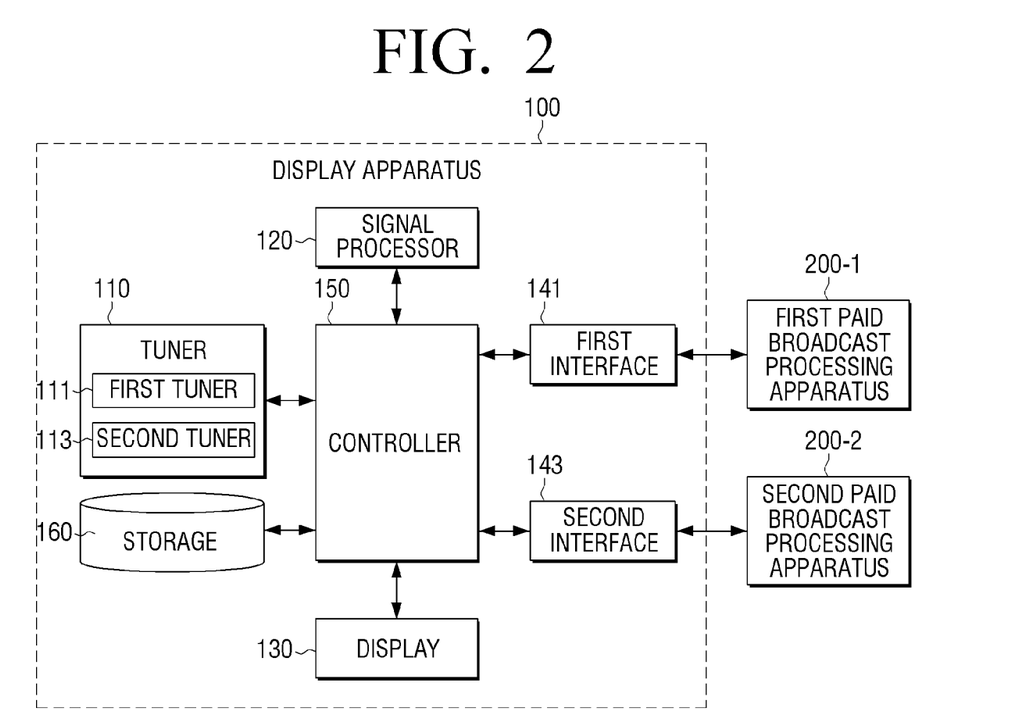
FIG. 2 is a second block diagram of a display apparatus which displays a paid broadcast signal according to another exemplary embodiment.

FIG. 2 is a second block diagram of a display apparatus which displays paid broadcast signals according to another exemplary embodiment.

As shown in FIG. 2, a display apparatus 100 includes a tuner 110, a signal processor 120, a display 130, first and second interfaces 141 and 143, a controller 150, and a storage 160. The other elements except for the first and second interfaces 141 and 143 have been described with reference to FIG. 1 and thus a detailed description thereof is omitted.

As described above, the interface 140 may include a plurality of interfaces and may be physically connected with a plurality of paid broadcast processing apparatuses 200. Specifically, the interface 140 may include the first and second interfaces 141 and 143 and the first interface 141 may be physically connected with a first paid broadcast processing apparatus 200-1 which descrambles a first paid broadcast signal of a first paid broadcast channel. The second interface 143 may be physically connected with a second paid broadcast processing apparatus 200-2 which descrambles a second paid broadcast signal of a second paid broadcast channel.

Accordingly, when the first and second paid broadcast signals are received through the first and second paid broadcast channels tuned by first and second tuners 111 and 113, the controller 150 determines whether the first and second paid broadcast processing apparatuses 200-1 and 200-2 are able to descramble the first and second paid broadcast signals or not based on pre-stored paid broadcast channel information of the first and second paid broadcast processing apparatuses 200-1 and 200-2.

When the controller 150 determines that the first paid broadcast processing apparatus 200-1 is able to descramble the first paid broadcast signal and the second paid broadcast processing apparatus 200-2 is able to descramble the second paid broadcast signal, the controller 150 transmits the first paid broadcast signal to the first paid broadcast processing apparatus 200-1 physically connected with the first interface 141 through the first interface 141, and transmits the second paid broadcast signal to the second paid broadcast processing apparatus 200-2 physically connected with the second interface 143 through the second interface 143.

Subsequently, when the first and second paid broadcast signals that have been descrambled by the first and second paid broadcast processing apparatuses 200-1 and 200-2 are received, the controller 150 controls the signal processor 120 and the display 130 to display the first and second paid broadcast signals which have been descrambled on a first area which is a main screen and a second area which is a sub screen, respectively. Accordingly, the display 130 may display the first paid broadcast signal which has been descrambled on the first area which is the main screen, and may display the second paid broadcast signal which has been descrambled on the second area which is the sub screen.

On the other hand, when the controller 150 determines that the first paid broadcast processing apparatus 200-1 is able to descramble the first paid broadcast signal and the second paid broadcast processing apparatus 200-2 is unable to descramble the second paid broadcast signal, the controller 150 transmits only the first paid broadcast signal to the first paid broadcast processing apparatus 200-1. Subsequently, when the first paid broadcast signal which has been descrambled is received from the first paid broadcast processing apparatus 200-1, the controller 150 controls the signal processor 120 and the display to display the first paid broadcast signal which has been descrambled on the first area which is the main screen, and to display a message that the second paid broadcast signal cannot be processed, on the second area which is the sub screen. Accordingly, the display 130 may display the first paid broadcast signal which has been descrambled on the first area which is the main screen, and may display the message that the second paid broadcast signal cannot be processed on the second area which is the sub screen.

Figure 3:
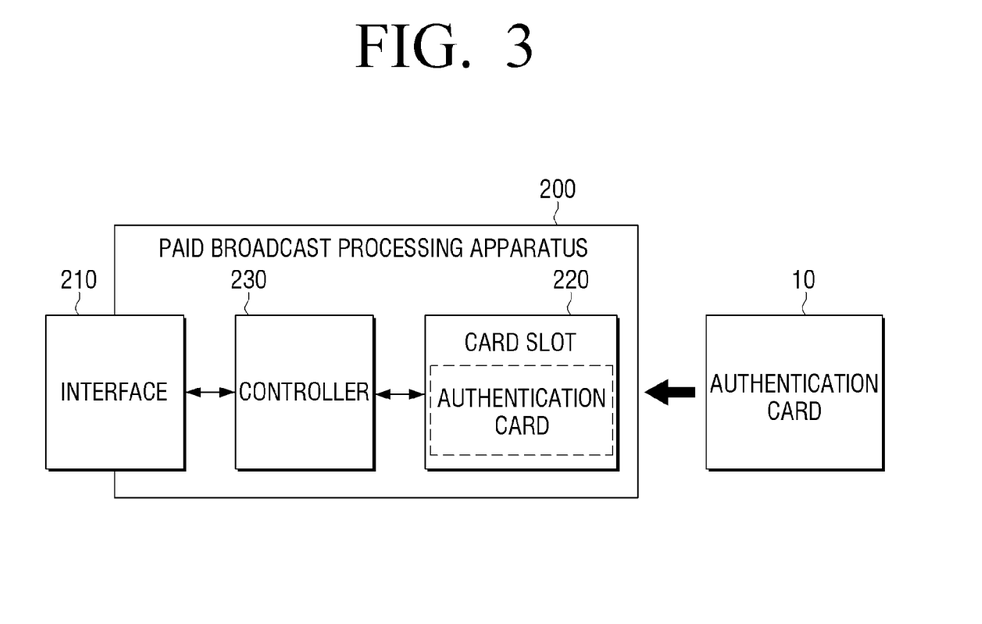
FIG. 3 is a block diagram of a paid broadcast processing apparatus according to an exemplary embodiment.

Hereinafter, elements of a paid broadcast processing apparatus 200 which descrambles a paid broadcast signal will be explained in detail.

FIG. 3 is a block diagram of a paid broadcast processing apparatus according to an exemplary embodiment.

As shown in FIG. 3, a paid broadcast processing apparatus 200 includes an interface 210, a card slot 220, and a controller 230. The interface 210 is connected with the display apparatus 100 according to a USB method, and may receive a paid broadcast signal from the display apparatus 100 or may transmit a paid broadcast signal which has been descrambled to the display apparatus 100. The paid broadcast signal recited herein may be a broadcast signal that is converted to meet the USB standard.

The card slot 220 supports insertion of an authentication card 10 that descrambles the paid broadcast signal received through the interface 210 to be displayed on the display apparatus 100. Specifically, as shown in FIG. 3, the card slot 220 includes an insertion hole through which the authentication card 10 to descramble a paid broadcast signal of a paid broadcast channel which has been already registered, is inserted. Accordingly, when the authentication card 10 is inserted through the insertion hole of the card slot 220, the authentication card 10 may descramble the paid broadcast signal which has been received from the display apparatus 100.

The controller 230 converts the paid broadcast signal received through the interface 210 into a form that is recognizable by the authentication card 10 inserted into the card slot 220, and converts the broadcast signal which has been descrambled through the authentication card 10 into a signal of the USB standard and transmits the broadcast signal to the display apparatus 100 through the interface 210.

Specifically, when the paid broadcast signal is received from the display apparatus 100 through the interface 210, the controller 230 converts the paid broadcast signal into a form that is recognizable by the authentication card 10 inserted into the card slot 220, and transmits the paid broadcast signal to the card slot 220. Accordingly, the authentication card 10 inserted into the card slot 220 descrambles the paid broadcast signal received through the card slot 220, and the paid broadcast signal that has been descrambled is transmitted to the controller 230 through the card slot 220. The operation of descrambling the paid broadcast signal using the authentication card 10 is well known and thus a detailed description thereof is omitted.

When the paid broadcast signal which has been descrambled is received from the authentication card 10 through the card slot 220, the controller 230 converts the paid broadcast signal which has been descrambled into a signal suitable for the USB standard, and the interface 210 transmits the paid broadcast signal that has been descrambled and converted into the signal of the USB standard to the display apparatus 100 physically connected with the paid broadcast processing apparatus 200. Accordingly, the display apparatus 100 may signal-process the paid broadcast signal which has been descrambled through the paid broadcast processing apparatus 200 into a displayable form and may display the paid broadcast signal.

Each element of the display apparatus 100 according to exemplary embodiments and the paid broadcast processing apparatus 200 which is physically connected with the display apparatus 100 and descrambles paid broadcast signals to be displayed on the display apparatus 100, has been described so far.

Hereinafter, a control method of a display apparatus 100 and a paid broadcast processing apparatus 200 which is physically connected with the display apparatus 100 and descrambles paid broadcast signals will be explained in detail.

Figure 4:
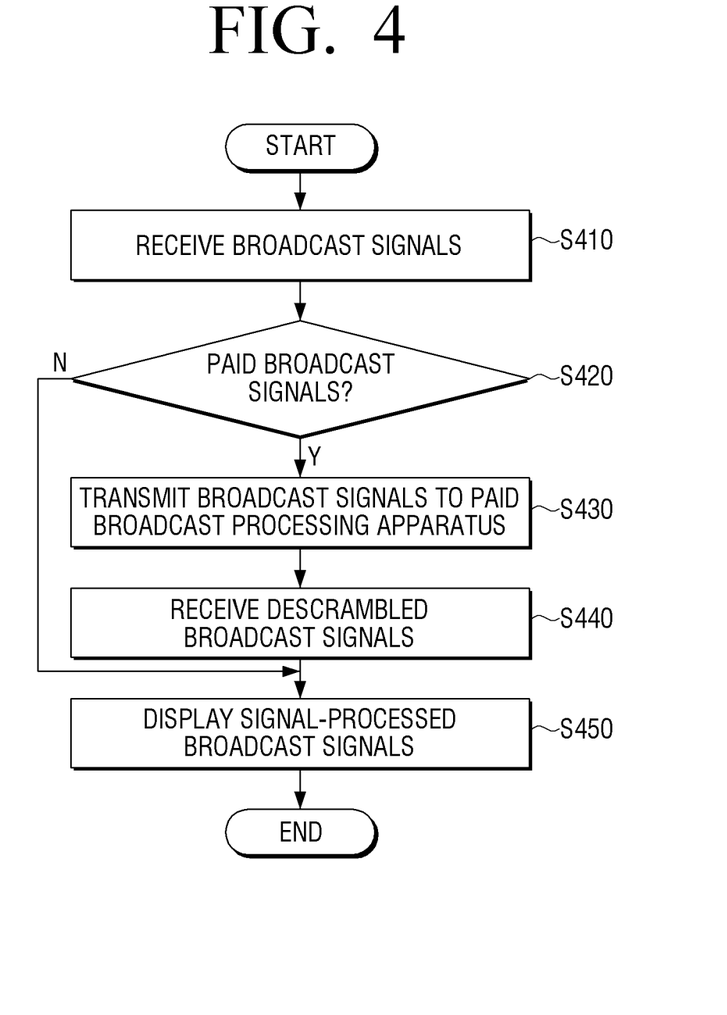
FIG. 4 is a flowchart illustrating a control method of a display apparatus according to an exemplary embodiment.

FIG. 4 is a flowchart illustrating a control method of a display apparatus according to an exemplary embodiment.

As shown in FIG. 4, the display apparatus 100 receives a broadcast signal through at least one broadcast channel (S410). When the broadcast signal is received, the display apparatus 100 determines whether the received broadcast signal is a paid broadcast signal or a free broadcast signal (S420). When the broadcast signal is the paid broadcast signal, the display apparatus 100 transmits the paid broadcast signal to the paid broadcast processing apparatus 200 physically connected with the display apparatus 100 through the interface of the USB method (S430). At this time, the display apparatus 100 may determine whether the paid broadcast processing apparatus 200 is able to descramble the paid broadcast signal or not based on paid broadcast channel information pre-stored regarding the paid broadcast processing apparatus 200 physically connected through the interface, and may transmit the paid broadcast signal to the paid broadcast processing apparatus 200. The paid broadcast channel information recited herein may be information on a paid broadcast channel that can be descrambled by the paid broadcast processing apparatus physically connected through the interface. Accordingly, when it is determined that the paid broadcast processing apparatus 200 physically connected through the interface is able to descramble the paid broadcast signal based on such paid broadcast channel information, the display apparatus 100 transmits the paid broadcast signal to the paid broadcast processing apparatus 200. Accordingly, the paid broadcast processing apparatus 200 descrambles the paid broadcast signal received from the display apparatus 100 and transmits the paid broadcast signal to the display apparatus 100. Specifically, when the paid broadcast signal is received, the paid broadcast processing apparatus 200 may descramble the paid broadcast signal through an authentication card inserted into the card slot and may transmit the paid broadcast signal which has been descrambled to the display apparatus 100.

When the paid broadcast signal which has been descrambled is received from the paid broadcast processing apparatus 200, the display apparatus 100 signal-processes the paid broadcast signal which has been descrambled into a displayable form and displays the paid broadcast signal (S440 and S450). On the other hand, when it is determined that the broadcast signal received at operation S410 is the free broadcast signal, the display apparatus 100 may signal-process the free broadcast signal into a displayable form and may display the broadcast signal at operation S450.

In addition, the display apparatus 100 may include a plurality of tuners (hereinafter, referred to as first and second tuners), and may display broadcast signals tuned by the plurality of tuners in the form of a PIP. That is, the display apparatus 100 may receive a first broadcast signal through a first broadcast channel which is tuned by the first tuner which is set as a main tuner, and may receive a second broadcast signal through a second broadcast channel which is tuned by the second tuner which is set as a sub tuner. When the first and second broadcast signals are received as described above, the display apparatus 100 determines whether the first and second broadcast signals are free broadcast signals or paid broadcast signals. For example, the first broadcast signal received through the first tuner may be the free broadcast signal and the second broadcast signal received through the second tuner may be the paid broadcast signal. In this case, the display apparatus 100 may signal-process the first broadcast signal received through the first tuner and may display the first broadcast signal on a first area which is a main screen. At this time, the display apparatus 100 transmits the second broadcast signal which is received through the second tuner and is the paid broadcast signal to the paid broadcast processing apparatus 200. Subsequently, when the second broadcast signal which has been descrambled is received from the paid broadcast processing apparatus 200, the display apparatus 100 signal-processes the second broadcast signal which has been descrambled and displays the second broadcast signal on a second area which is a sub screen. Accordingly, the display apparatus 100 displays the first and second broadcast signals on the first area which is the main screen and the second area which is the sub screen, respectively, thereby displaying the plurality of broadcast signals in the form of the PIP.

On the other hand, when both the first and second broadcast signals received through the first and second tuners are the paid broadcast signals, the display apparatus 100 displays one of the first and second broadcast signals that has been descrambled on one of the first and second areas, and displays a message that the other broadcast signal cannot be processed on the other area.

Specifically, both the first and second broadcast signals received through the first and second tuners may be the paid broadcast signals and the single paid broadcast processing apparatus 200 may be physically connected with the display apparatus 100 through the interface. In this case, the display apparatus 100 may determine which of the first and second broadcast signals can be descrambled by the paid broadcast processing apparatus 200 physically connected through the interface based on pre-stored paid broadcast channel information. For example, when it is determined that the first broadcast signal can be descrambled by the paid broadcast processing apparatus 200, the display apparatus 100 transmits the first broadcast signal to the paid broadcast processing apparatus 200. Subsequently, when the first broadcast signal that has been descrambled is received from the paid broadcast processing apparatus 200, the display apparatus 100 signal-processes the first broadcast signal which has been descrambled and then displays the first broadcast signal on the first area which is the main screen. At this time, the display apparatus 100 generates a message that the second broadcast signal cannot be processed and displays the message on the second area which is the sub screen. Accordingly, the first broadcast signal which has been descrambled may be displayed on the first area of the display apparatus 100, and the message that the second broadcast signal cannot be processed may be displayed on the second area.

In addition, the display apparatus 100 may be physically connected with the plurality of paid broadcast processing apparatuses 200-1 and 200-2 through the first and second interfaces as shown in FIG. 2. Specifically, the display apparatus 100 may be connected with the first paid broadcast processing apparatus 200-1, which descrambles a paid broadcast signal of a first paid broadcast channel, through the first interface, and may be connected with the second paid broadcast processing apparatus 200-2, which descrambles a paid broadcast signal of a second paid broadcast channel, through the second interface.

When the display apparatus 100 is connected with the first and second paid broadcast processing apparatuses 200-1 and 200-2 through the first and second interfaces, and the broadcast signals received through the first and second tuners are paid broadcast signals, the display apparatus 100 transmits the paid broadcast signals to the first and second paid broadcast processing apparatuses 200-1 and 200-2 through the first and second interfaces based on pre-stored paid broadcast channel information. Subsequently, when the paid broadcast signals that have been descrambled are received from the first and second paid broadcast processing apparatuses 200-1 and 200-2, the display apparatus 100 may display the paid broadcast signal that has been descrambled by the first paid broadcast processing apparatus 200-1 on the first area which is the main screen, and may display the paid broadcast signal that has been descrambled by the second paid broadcast processing apparatus 200-2 on the second area which is the sub screen.

Hereinafter, a control method of a paid broadcast processing apparatus 200 which is physically connected with a display apparatus 100 through an interface of a USB method and descrambles a paid broadcast signal will be explained in detail.

Figure 5:
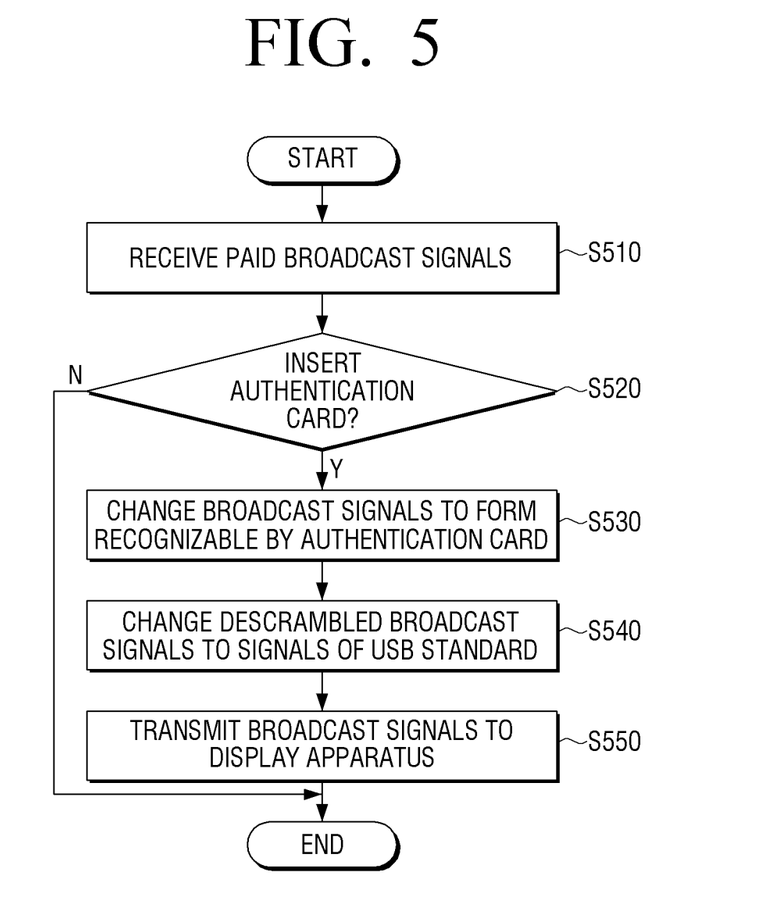
FIG. 5 is a flowchart illustrating a control method of a paid broadcast processing apparatus according to an exemplary embodiment.

FIG. 5 is a flowchart illustrating a control method of a paid broadcast processing apparatus according to an exemplary embodiment.

As shown in FIG. 5, the paid broadcast processing apparatus 200 receives a paid broadcast signal from the display apparatus 100 which is physically connected through the interface of the USB method (S510). When the paid broadcast signal is received, the paid broadcast processing apparatus 200 determines whether an authentication card is inserted into the card slot or not (S520). The paid broadcast processing apparatus 200 may include the card slot and the authentication card may be inserted through an insertion hole of the card slot as explained above with reference to FIG. 3. Accordingly, the paid broadcast processing apparatus 200 may determine whether the authentication card is inserted through the insertion hole of the card slot.

When it is determined that the authentication card is inserted into the card slot, the paid broadcast processing apparatus 200 converts the paid broadcast signal received through the interface into a form that is recognizable by the authentication card (S530). Specifically, the paid broadcast signal received through the interface may be a broadcast signal that has been converted into a signal of the USB standard. According to an exemplary embodiment, the broadcast signal in the form recognizable by the authentication card may be a paid broadcast signal that has been received by the display apparatus 100 through a broadcast channel tuned by the tuner.

When the paid broadcast signal is converted as described above, the paid broadcast processing apparatus 200 descrambles the paid broadcast signal through the authentication card inserted into the card slot. Subsequently, the paid broadcast processing apparatus 200 converts the paid broadcast signal which has been descrambled into a signal of the USB standard to transmit the paid broadcast signal to the display apparatus 100 through the interface, and transmits the paid broadcast signal to the display apparatus 100 (S540 and S550).

Accordingly, the display apparatus 100 may signal-process the paid broadcast signal which has been descrambled by the paid broadcast processing apparatus 200 into a displayable form and may display the paid broadcast signal.

Heretofore, exemplary embodiments have been described.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a tuner configured to receive at least one broadcast signal through at least one broadcast channel;
   a signal processor configured to signal-process the received at least one broadcast signal;
   a display configured to display the signal-processed at least one broadcast signal;
   an interface connected with at least one paid broadcast processing apparatus which descrambles at least one paid broadcast signal; and
   a controller configured to control the signal processor to signal-process the received at least one broadcast signal into a form that is displayable through the display, and, when the received at least one broadcast signal is the at least one paid broadcast signal, transmit the at least one paid broadcast signal to the at least one paid broadcast processing apparatus through the interface,
   wherein the tuner comprises:
      a first tuner configured to receive a broadcast signal through a tuned first broadcast channel; and
      a second tuner configured to receive a broadcast signal through a tuned second broadcast channel,
   wherein the interface comprises:
      a first interface connected with a first paid broadcast processing apparatus configured to descramble a paid broadcast signal of a first paid broadcast channel; and
      a second interface connected with a second paid broadcast processing apparatus configured to descramble a paid broadcast signal of a second paid broadcast channel,
   wherein, upon a condition that the broadcast signals received from the first tuner and the second tuner are checked and determined to be the at least one paid broadcast signals based on said check, the controller transmits the at least one paid broadcast signals to the first paid broadcast processing apparatus and the second paid broadcast processing apparatus through the first interface and the second interface, respectively, based on the pre-stored paid broadcast channel information, wherein, upon a condition that it is determined that the broadcast signals received from the first tuner and the second tuner is a free broadcast signal and the other broadcast signal is the at least one paid broadcast signal, the controller controls the signal processor and the display to display broadcast signals which are descrambled and which are related to the free broadcast signal, and to display the at least one paid broadcast signal, on a first area and a second area, respectively, and wherein, upon a condition that the broadcast signals received from the first tuner and the second tuner are the at least one paid broadcast signals, the controller controls the signal processor and the display to display a broadcast signal that is descrambled and is related to one of the at least one paid broadcast signals on one of the first area and the second area, to generate a message that the other paid broadcast signal cannot be processed, and to display the message on the other one of the first area and the second area.

2. The display apparatus of claim 1, further comprising a storage configured to store paid broadcast channel information of the at least one paid broadcast processing apparatus which is connected through the interface, wherein the controller determines whether the at least one paid broadcast processing apparatus is able to descramble the at least one paid broadcast signal based on paid broadcast channel information stored in the storage, and transmits the at least one paid broadcast signal to the paid broadcast processing apparatus.

3. The display apparatus of claim 2, wherein the at least one paid broadcast processing apparatus is connected with the interface in a USB method, and wherein, when the at least one paid broadcast signal is received through the interface, the at least one paid broadcast processing apparatus descrambles the at least one paid broadcast signal through an authentication card inserted into a card slot and transmits the at least one paid broadcast signal to the display apparatus.

4. The apparatus of claim 1, wherein the first area comprises a main screen and the second area comprises a sub-screen.

5. A control method of a display apparatus, the method comprising:

receiving at least one broadcast signal through at least one broadcast channel;

determining whether or not the received at least one broadcast signal is at least one paid broadcast signal;

when the at least one broadcast signal is the at least one paid broadcast signal, transmitting the at least one paid broadcast signal to at least one paid broadcast processing apparatus which is connected with the display apparatus and which descrambles the at least one paid broadcast signal; and when the descrambled broadcast signal is received from the at least one paid broadcast processing apparatus, signal-processing the descrambled broadcast signal and displaying a signal-processed broadcast signal, wherein the receiving comprises receiving a broadcast signal of a first broadcast channel tuned by a first tuner and a broadcast signal of a second broadcast channel tuned by a second tuner, and wherein the display apparatus is connected with a first paid broadcast processing apparatus which descrambles a paid broadcast signal of a first paid broadcast channel through a first interface, and is connected with a second paid broadcast processing apparatus which descrambles a paid broadcast signal of a second paid broadcast channel through a second interface, wherein the transmitting comprises, upon a condition that the broadcast signals received from the first tuner and the second tuner are checked and determined to be the at least one paid broadcast signals, transmitting the at least one paid broadcast signals to the first paid broadcast processing apparatus and the second paid broadcast processing apparatus through the first interface and the second interface based on the pre-stored paid broadcast channel information, wherein the displaying comprises, upon a condition that it is determined that one of the broadcast signals received from the first tuner and the second tuner is a free broadcast signal and the other broadcast signal is at least one paid broadcast signal, displaying broadcast signals which are descrambled related to the free broadcast signal and the at least one paid broadcast signal on a first area and a second area, respectively, and wherein the displaying comprises, upon a condition that the broadcast signals received from the first tuner and the second tuner are the at least one paid broadcast signals, displaying a broadcast signal that is descrambled and which relates to one of the at least one paid broadcast signals on one of the first area and the second area, generating a message that the other paid broadcast signal cannot be processed, and displaying the message on the other one of the first area and the second area.

6. The method of claim 5, wherein the transmitting comprises determining whether the at least one paid broadcast processing apparatus is able to descramble the at least one paid broadcast signal based on pre-stored paid broadcast channel information that is related to the at least one paid broadcast processing apparatus, and transmitting the paid broadcast signal to the at least one paid broadcast processing apparatus.

7. The method of claim 6, wherein, when the at least one paid broadcast signal is received, the at least one paid broadcast processing apparatus descrambles the at least one paid broadcast signal through an authentication card inserted into a card slot and transmits the at least one paid broadcast signal to the display apparatus.

8. The method of claim 5, wherein the first area comprises a main screen and the second area comprises a sub-screen.

* * * * *